United States Patent
Bosch et al.

(10) Patent No.: US 6,274,184 B1
(45) Date of Patent: Aug. 14, 2001

(54) PROCESS FOR PRODUCING SHAPED POTATO PRODUCTS

(75) Inventors: Thomas Bosch, Kochendorf; Hans Pfeilstetter, Heilbronn; Peter Detje, Heilbronn; Oliver Lung, Heilbronn, all of (DE)

(73) Assignee: Bestfoods, Englewood Cliffs, NJ (US)

( * ) Notice: Subject to any disclaimer, the term of this patent is extended or adjusted under 35 U.S.C. 154(b) by 0 days.

(21) Appl. No.: 09/237,121

(22) Filed: Jan. 26, 1999

(30) Foreign Application Priority Data

Feb. 9, 1998  (DE) ................................. 198 05 116

(51) Int. Cl.⁷ .................................................... A23L 1/216
(52) U.S. Cl. .......................... 426/302; 426/512; 426/516; 426/637
(58) Field of Search .................... 426/102, 302, 426/637, 454, 464, 285, 512, 516

(56) References Cited

U.S. PATENT DOCUMENTS

| 4,156,744 | * | 5/1979 | Kiploks et al. ...................... 426/637 |
| 4,276,314 | * | 6/1981 | Andersen ...................... 426/637 X |
| 4,283,425 | * | 8/1981 | Yuan et al. ........................... 426/102 |
| 5,059,435 | * | 10/1991 | Sloan et al. ........................... 426/102 |
| 5,486,369 | | 1/1996 | Mason et al. ........................ 426/321 |
| 5,492,704 | | 2/1996 | Stubbs et al. ........................... 426/96 |
| 5,648,110 | * | 7/1997 | Wu et al. .............................. 426/102 |
| 5,891,496 | * | 4/1999 | Hannah et al. ....................... 426/102 |
| 6,022,569 | * | 2/2000 | Rogols et al. ........................ 426/102 |

FOREIGN PATENT DOCUMENTS

| 9000196 | 1/1997 | (JP) . |
| WO 9622029 | 7/1996 | (WO) . |

OTHER PUBLICATIONS

European Search Report dated Mar. 21, 2000 for EP 0 935 927 A3.

* cited by examiner

Primary Examiner—Arthur L. Corbin
(74) Attorney, Agent, or Firm—Norris McLaughlin & Marcus

(57) ABSTRACT

A process for producing shaped large-piece dried potato products, in which raw potatoes are peeled, cut to a particle size of 0.6 to 2 mm in one dimension and then blanched. Surface water is removed and the particles are then covered with a coating. The coated particles are shaped to form the desired product shape. The shaped product is then dried to a water content below 12% by convection drying at temperatures below 110° C. In a further aspect of the present invention, raw potatoes may first be cut to a particle size larger than finally desired, blanched, cooled, and subsequently cut into the finally desired smaller particle size.

21 Claims, No Drawings

PROCESS FOR PRODUCING SHAPED POTATO PRODUCTS

FIELD OF THE INVENTION

The invention relates to shaped large-piece dried potato products, such as French fries, fried potato slices, Rösti slices, potato dumplings or potato noodles, which may be readily rehydrated, and to a process for their production.

BACKGROUND OF THE INVENTION

The texture of rehydrated dried potatoes is to a great extent determined by the swelling state of the cell aggregate at the end of the stipulated preparation time. When potato pieces are dried, the volume shrinks during the drying process to approximately 50% of the starting volume. This compression of the cell aggregate makes rehydration more difficult and incomplete reabsorption of the water removed during drying occurs during the rehydration. The prepared product no longer swells to its original shape, the consistency is frequently tough and the larger the potato pieces, the more difficult it is to achieve good rehydration properties.

The object underlying the invention is therefore to provide large-piece dried potato products which exhibit good rehydration properties, rapid and complete rehydration being sought after.

A number of production processes are known for dried potato products which are prepared by subsequent rehydration and cooking.

Abstract of WO 9622029-A discloses a process for producing potato chips. Dehydrated potato pieces, for example potato flakes, are rehydrated to form a paste, which is then extruded.

Abstract of JP 9000196-A discloses the production of potato products by rehydration of dried thinly sliced potatoes.

Coleman, et. al, U.S. Pat. No. 5,486,369 discloses a fried potato product suitable for processing in the microwave. Raw potatoes are sliced into strips, blanched in a solution comprising table salt and sugar, cooked, dried and fried, producing a product having a moisture content of 10 to 40%, which is then packaged and is said to be able to be kept without freezing and sterilization. It can be reconstituted by heating in a microwave oven without using water or sauces.

Stubbs, et. al, U.S. Pat. No. 5,492,704 discloses a process for dehydrating potatoes for the production of hash browns. In this process, small potato pieces, for example elongate grated potato, is coated with a dry mixture which comprises a particulate component, e.g. granular starch or ground potatoes, which ensures the separation of small adjacent potato pieces. The coating is carried out in this case to ensure that the small potato pieces, even after drying, remain separate and do not stick to one another. There is no shaping to large piece potato products before drying. After reconstitution, when heated in the pan, the small potato pieces may stick together.

In contrast therewith, according to the present invention, the potato pieces are shaped before drying to form large-piece potato products. Although they are made up of individual potato particles, the potato pieces are shaped large-piece items not only during, but also after drying and after rehydration, such as French fries, fried potato slices, Rösti corners, potato dumplings, etc.

Surprisingly, it has been found according to the invention that small coated potato particles can be shaped to form large pieces which retain their shape and do not fall apart, but nevertheless have an open structure which ensures good and rapid drying and rapid and complete rehydration. By means of the process according to the invention, a web-like product is obtained which possesses open cavities into which the drying air and the rehydration water can penetrate, although the overall shape is retained. A porous structure which possesses closed pores, such as are formed in the action of baking powder, does not possess the desired properties of the present invention. During the drying of the shaped pieces according to the present invention, the surface dries more rapidly and becomes dimensionally stable, whereas in the interior, the drying takes place more slowly, so that the desired open-pore structure is formed by shrinkage.

SUMMARY OF THE INVENTION

In the process according to the present invention, raw potatoes are peeled, cut to a particle size of 0.6 to 2 mm in one dimension and then blanched. If appropriate, after prior removal of surface water, the particles are covered with a coating and the coated particles are shaped to form the desired product shape, whereupon the shaped product is then dried to a water content below 12% by convection drying at temperatures below 100° C. The products, according to the present invention, are shaped large-piece dried potato products.

In a further aspect of the present invention, raw potatoes may first be cut to a particle size larger than finally desired, blanched, cooled, and subsequently cut into the finally desired smaller particle size.

DETAILED DESCRIPTION OF THE INVENTION

For the process according to the invention, preferably, use is made of potatoes having a starch content range between 10 and 16%. Low-starch potatoes have a higher water binding capacity and thus give a better structure.

The potatoes are preferably peeled by steam peeling.

The particle size of the potatoes is of critical importance for the properties of the product and is dependent on the type of products to be produced. Different potato particles are required for producing fried potato slices than, for example, for producing potato dumplings. It is of importance that at least in one dimension the particle size is 0.6 to 2 mm, preferably 1.0 to 1.6 mm. If this size is maintained in one dimension, the size in the other dimensions is of lesser importance. Preferably, small strips are cut into a cross-section of 1.0 to 1.6 mm. A coarsely grated material is also suitable and preferred, for example, for Rösti corners. The shape and dimensions of the potato particles influence, as structure-forming element, the density of the shaped final product.

The blanching, firstly, inactivates the enzymes, and secondly pregelatinizes the starch to a desired extent. Depending on the shape and size of the potato particles, the properties of the product can therefore be varied by the blanching conditions. Because the stability and elasticity of the potato strips are influenced by the blanching, the porous structure in the shaped final product can also be influenced by this means. Generally, the blanching is carried out for 6–12 minutes at 85–95° C.

Preferably, a cooling stage is provided immediately after the blanching. The cooling can be performed with cold water, by dipping or pouring, for example. The cooling is expedient to control a degree of blanching exactly and to prevent post-blanching.

After the blanching, and prior to the coating, expediently, adherent surface water is removed. This can be performed by centrifuging or by pressing in a belt press. Removing the surface water promotes uniform coating without lump formation.

If the potato particles are too small, it can be a disadvantage, in that too much starch is washed out due to the relatively large surface in relation to the particle mass. Thereby a product loss of up to 20% by weight can occur.

This problem can be avoided according to a further aspect of the present invention, in that the potatoes are first cut into a particle size larger than finally desired and only after blanching and cooling these larger particles are cut into the finally desired smaller particle size. Hereby it is necessary to allow or to effect a retrogradation after the blanching before the further cutting, because otherwise the small particles cannot be accurately cut.

In this modification of the process according to the present invention, the potatoes are first coarsely cut, preferably into slices of about 15 mm thickness. These are then blanched and cooled, preferably to 5–20° C. for 10–30 hours, whereby sufficient retrogradation takes place so that the coarsely cut potato pieces subsequently can be cut to the desired final size of 0.6 to 2 mm cross-section, preferably into strips with a cross section of 1 mm. Subsequently, the potato strips are mixed with the coating agent, shaped into the form of the final product, and dried.

The coating is generally a pulverulent mixture which can preferably be applied in a drum mixer. Preferably, the coating comprises starch or essentially consists of starch.

Suitable starches are pregelatinized and native starches. The pregelatinized (also modified) starch gives, on the one hand, the necessary binding during shaping of the product to produce stable shaped items which can be handled in an industrial process and, on the other hand, influences the characteristics of the consistency (depending on starch type) of the prepared end product. Native starches give additional stability in the preparation (rehydration) of the product, in that they improve the coadhesiveness of the product by the gelatinization during the cooking phase, and also affect the consistency of the end product. Use can also be made of ground dried potatoes, which at the same time also have a natural protein content.

Preferably, in addition to starch, the coating comprises some protein. In general, all protein types are suitable, but preference is given to coagulable proteins such as hen's egg white or milk albumin, which improve the stability of the shaped item by coagulation during the drying process and the final preparation. The amount of protein can generally be 1–10%, preferably 1–3%, calculated as dry protein, based on the non-dried potato constituent. The coagulated protein ensures a particularly high stability both during shaping and also in the shaped dry product and in the final rehydration. The dry product thus prepared can be dropped into cold water without disintegrating.

The coating can also contain some fat, but no more than about 3%, e.g. 1–3%, based on the non-dried potato constituent. Higher fat contents have adverse effects on the stability of the shaped potato products. The fat only serves for sensory purposes. The fat can be admixed in liquid form, but fat powders can also be used. The fats used are, because of the necessary storage life of the dried end product, essentially hardened fats, such as soya bean, sunflower seed or palm oil fats.

Flavouring and/or colouring components can be present in the coating, depending on the type of the desired end product.

The coating is applied in an amount of 1 to 20%, preferably 3 to 15% (not taking into account the minimal amount of flavouring and/or colouring components), based on the non-dried potato constituent.

The shaping of the coated particles to give the desired shaped pieces is essential for the process according to the invention. In its shaping operation, a certain pressure is exerted, but the shaping pressure should never be excessive, since it is not a dense mass which is sought but a loose structure which, despite dimensional stability, gives a porous web-like product. The shaping pressure is dependent on the water content of the mixture which is generally 60–85, preferably 70–80% by weight. Water content, coating, dimension of the potato particles, degree of blanching and shaping must be matched with one another in a product-dependent manner.

Shaping equipment which can be used includes all commercially available shaping machines for pasty doughs, for example shaping extruders or volumetric metering machines having piston discharge systems.

The drying is expediently carried out by conventional convection drying at temperatures below 110° C., preferably below 100° C. Preferably, drying is carried out for 1 to 8 hours with decreasing temperature in a temperature range from 100 to 60° C. Generally, the drying is carried out to a water content of below 12%, preferably below 10%.

On account of the shrinking individual particles of the shaped items, during the drying, a cavity fraction is formed in the product, without the overall shaped item shrinking to a significant extent or breaking up, since the surface of the shaped items dries first and stabilizes itself.

The drying times are greatly decreased in comparison with the drying times in the case of usual dried potatoes. In addition, the dried products have a rapid and uniform rehydration capacity.

Unless stated otherwise, all percentages in the description above and examples below are by weight.

EXAMPLE 1

1. Potato Dumplings

The following steps are performed using Cultivar Hansa potatoes.

Raw potatoes are peeled. The peeled potatoes are cut to a particle size of 1.2 mm×1.2 mm × potato length. The potato pieces are blanched at 90° C. for 10 minutes and then cooled in cold water for 3 minutes. Surface water is removed from the blanched potato pieces by centrifuging for 1 minute to a final water content of approximately 75%.

The following components were mixed in a drum mixer:

| | |
|---|---|
| Potato strips | 95.0% |
| Cooking salt | 1.0% |
| Ground dried potatoes | 3.0% |
| Native potato starch | 1.0% |

The coated particles are shaped to dumplings (diameter approximately 2 cm) in a shaping machine based on the volumetric metering principle (KOPPENS shaping machine VM 400 HD).

The shaped product is then dried to a final water content of 8% by convection drying. The drying process is carried out by hot air convection drying on a tray dryer at 90° C. for 1 hour, followed by 80° C. for another 1 hour, and 65° C. for 2 hours.

Preparation:
a. Side-Dish:
Simmer for 5 minutes in boiling water; the potato dumplings are completely swollen and cooked after 5 minutes and thus ready to eat as a side-dish;
b. Instant Meal:
The potato dumplings are stirred into boiling water together with a dried sauce and give a ready-to-eat instant meal after a cooking time of 8–10 minutes.

EXAMPLE 2

2. Potato Noodles
The following steps are performed using Cultivar Hansa potatoes:
peeling
cutting: 1.2×1.2 mm× potato length
blanching: 90° C./10 min
cooling: 3 minutes/cold water
centrifuging: 1 minute/final water content approximately 75%
mixing in the drum mixer:

| | |
|---|---|
| Potato strips | 87% |
| Salt | 1.5% |
| Hen's egg white/dried | 1% |
| Pregelatinized potato starch | 1% |
| Hardened sunflower seed fat (fat powder) | 2.5% |
| Ground dried potatoes | 5% |
| Skimmed milk powder | 2.0% |

The coated particles are shaped to potato noodles (approximately 6 cm long, 1 cm thick) using Extruder (Rheon 207 DD) as a shaping machine.
The shaped product is then dried to a final water content of 7% by convection drying. The drying process is carried out by hot air convection drying on a tray drier at 90° C. for 1 hour, followed by 65° C. for 2 hours.
Preparation:
Cook the potato noodles in the pan for 5 minutes until the water has been completely absorbed; add some fat to the pan and fry until golden brown (approximately 2 minutes);

EXAMPLE 3

3. Rösti Slices
The following steps are performed using Cultivar Hansa potatoes:
peeling
grating: 5×1.5 mm
blanching: 90° C./8 min
cooling: 3 minutes/cold water
centrifuging: 1 minute/final water content approximately 75%
mixing in the drum mixer:

| | |
|---|---|
| Grated potato | 90% |
| Salt | 1.5% |
| Whey protein powder | 2% |
| Native potato starch | 2% |
| Toasted onion powder | 0.3% |
| Ground dried potatoes | 4% |
| Dextrose monohydrate | 0.2% |

The coated particles are shaped to Rösti slices in a shaping machine working by the volumetric metering principle (KOPPENS shaping machine VM 400 HD).
The shaped product is then dried to a final water content of 7% by convection drying. The drying process is carried out by hot air convection drying on a tray drier at 90° C. for 1 hour, followed by 80° C. for 3 hours, and 65° C. for 2 hours.
Preparation:
The Rösti slices rehydrate completely in boiling water in 5 minutes; the final preparation is performed by deep-frying in fat at 180° C. until the surface is crispy and golden brown (approximately 2 minutes).

While the process of the invention has been described with reference to preferred embodiments thereof, as will be apparent to those skilled in the art, certain changes and modifications can be made without departing from the scope of the invention as defined by the following claims.

What is claimed is:

1. A process for producing a shaped large-piece dried rehydratable potato product, consisting essentially of:
   peeling raw potatoes,
   cutting said peeled potatoes to a particle size of 0.6 to 2 mm in one dimension to form potato particles,
   blanching said potato particles,
   removing surface water covering said blanched potato particles,
   covering said potato particles with a coating to form coated particles,
   shaping said coated particles to form a desired large-piece potato product shape,
   drying said shaped large-piece potato product to a water content below 12% by convection drying at temperatures below 110° C.,and
   rehydrating said large-piece potato product prior to consumption.

2. The process according to claim 1, wherein said potatoes are cut to give a coarse grated product.

3. The process according to claim 1, wherein said potatoes are cut to give strips having a diameter of 1.0 to 1.6 mm.

4. The process according to claim 1, wherein said potato particles are cooled after blanching.

5. The process according to claim 1, wherein said potato particles are cooled with cold water after blanching.

6. The process according to claim 1, wherein said surface water is removed by pressing in a belt press.

7. The process according to claim 1, wherein said coating comprises starch.

8. The process according to claim 1, wherein said coating comprises starch chosen from the group consisting of native starch and pregelatinized starch.

9. The process according to claim 1, wherein said coating comprises ground dried potatoes.

10. The process according to claim 1, wherein said coating comprises protein.

11. The process according to claim 1, wherein said coating additionally comprises fat.

12. The process according to claim 1, wherein said coating comprises flavouring components.

13. The process according to claim 1, wherein said coating comprises colouring components.

14. The process according to claim 1, wherein said coating is applied in an amount of 1–20% based on the non-dried potato constituent.

15. The process according to claim 1, wherein said shaping is performed by means of an extruder.

16. The process according to claim 1, wherein said shaping is performed by means of a volumetric metering machine.

17. The process according to claim 1, wherein said drying is carried out for 1–8 hours with decreasing temperature in the range from 100 to 60° C.

18. A process according to claim 1, wherein said potato products are chosen from the group consisting of French fries, fried potato discs, Rösti slices, potato dumplings or potato noodles.

19. A process for producing a shaped large-piece dried rehydratable potato product, consisting essentially of:
   peeling raw potatoes,
   cutting said peeled potatoes to a particle size larger than finally desired,
   blanching said larger potato particles,
   removing surface water covering said blanched larger potato particles,
   cooling said blanched larger potato particles,
   cutting said cooled larger potato particles into finally desired smaller potato particle sizes of 0.6 to 2 mm cross-section,
   covering said smaller potato particles with a coating to form coated particles,
   shaping said coated particles to form a desired large-piece potato product shape,
   drying said shaped large-piece potato product to a water content below 12% by convection drying at temperatures below 110° C., and
   rehydrating said large-piece potato product prior to consumption.

20. The process according to claim 19, wherein said raw potatoes are first cut into slices of about 15 mm thickness.

21. The process according to claim 19, wherein the larger potato particles after blanching are cooled to 5 to 20° C. for 10–30 hours before they are cut to the desired final size.

* * * * *